(12) United States Patent
Silva et al.

(10) Patent No.: US 10,184,317 B2
(45) Date of Patent: Jan. 22, 2019

(54) CHECK VALVE WITH VALVE MEMBER BIASED BY CONNECTORS EXTENDING FROM A VALVE SEAT FOR OPERATION OF A SUBTERRANEAN TOOL

(71) Applicant: BAKER HUGHES, A GE COMPANY, LLC, Houston, TX (US)

(72) Inventors: Zachary S. Silva, Houston, TX (US); Andre' J. Porter, Houston, TX (US)

(73) Assignee: BAKER HUGHES, A GE COMPANY, LLC

( * ) Notice: Subject to any disclaimer, the term of this patent is extended or adjusted under 35 U.S.C. 154(b) by 427 days.

(21) Appl. No.: 14/930,334

(22) Filed: Nov. 2, 2015

(65) Prior Publication Data

US 2017/0101850 A1 Apr. 13, 2017

Related U.S. Application Data

(63) Continuation-in-part of application No. 14/880,991, filed on Oct. 12, 2015, now abandoned.

(51) Int. Cl.
*E21B 34/10* (2006.01)
*E21B 43/116* (2006.01)
*F16K 15/02* (2006.01)

(52) U.S. Cl.
CPC ............ *E21B 34/10* (2013.01); *E21B 43/116* (2013.01); *F16K 15/021* (2013.01)

(58) Field of Classification Search
CPC ....... E21B 34/10; E21B 43/116; F16K 15/021
See application file for complete search history.

(56) References Cited

U.S. PATENT DOCUMENTS

| | | | | |
|---|---|---|---|---|
| 3,494,417 A | * | 2/1970 | Fredd | E21B 34/105 166/321 |
| 3,517,745 A | * | 6/1970 | Suman, Jr. | E21B 43/116 166/297 |
| 3,646,607 A | * | 2/1972 | Dower | E21B 21/10 175/218 |
| 4,140,188 A | * | 2/1979 | Vann | E21B 43/117 166/63 |

(Continued)

FOREIGN PATENT DOCUMENTS

WO 9803766 A1 1/1998
WO 2012037645 A1 3/2012

*Primary Examiner* — Matthew R Buck
*Assistant Examiner* — Aaron L Lembo
(74) *Attorney, Agent, or Firm* — Shawn Hunter

(57) ABSTRACT

A check valve has a valve member flexibly attached to a seat with resilient members that fold in response to flow above a predetermined value to shut the valve. The flexibly extending members store potential energy that is released to separate the valve member from the seat when the pressure applied against the seated valve member declines to the point that the potential energy stored in the flexible members is able to move the valve member off the seat. The valve assembly including the valve member, the seat and the flexible members can be a common material, or can be all one or more nonmetallic materials or involve composites or other easily drilled materials that are compatible with the operating conditions of pressure differential, temperature and composition of the well fluid. The check valve assembly can be pushed with pressure when closed to operate a subterranean tool.

41 Claims, 2 Drawing Sheets

(56) References Cited

U.S. PATENT DOCUMENTS

| | | | |
|---|---|---|---|
| 4,628,996 A | 12/1986 | Arnold | |
| 4,709,900 A * | 12/1987 | Dyhr | E21B 21/001 251/4 |
| 4,850,393 A * | 7/1989 | Lashomb | F16K 15/021 137/528 |
| 5,454,399 A | 10/1995 | Kazakis et al. | |
| 5,472,053 A * | 12/1995 | Sullaway | E21B 17/14 166/327 |
| 5,769,125 A * | 6/1998 | Duer | E03F 7/04 137/512 |
| 5,785,083 A | 7/1998 | Tang | |
| 7,051,812 B2 * | 5/2006 | McKee | E21B 33/08 166/186 |
| 2004/0250864 A1 * | 12/2004 | Zelson | F16K 15/144 137/859 |
| 2011/0108284 A1 | 5/2011 | Flores et al. | |
| 2011/0232915 A1 | 9/2011 | Kellner et al. | |
| 2012/0312548 A1 * | 12/2012 | Swist | E21B 21/10 166/373 |
| 2013/0175040 A1 | 7/2013 | Madero et al. | |
| 2015/0013982 A1 | 1/2015 | Getzlaf et al. | |

* cited by examiner

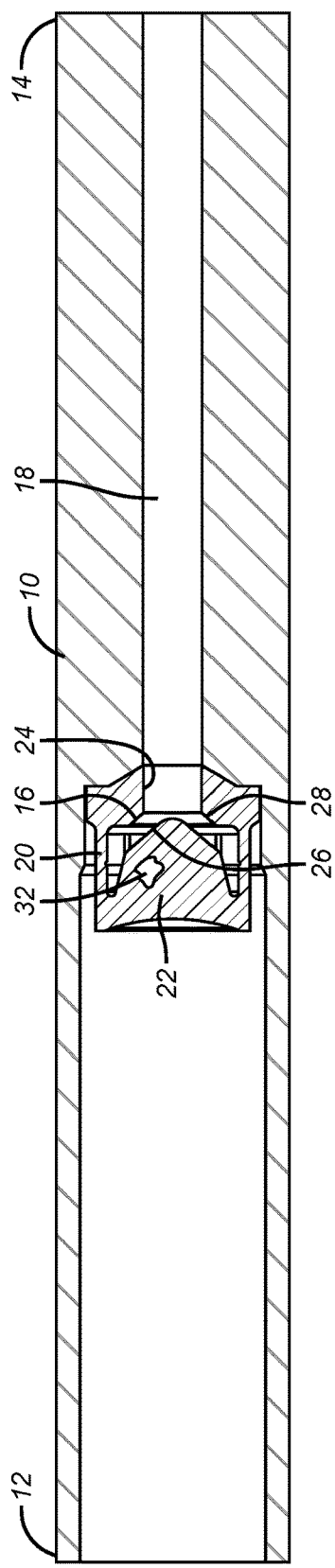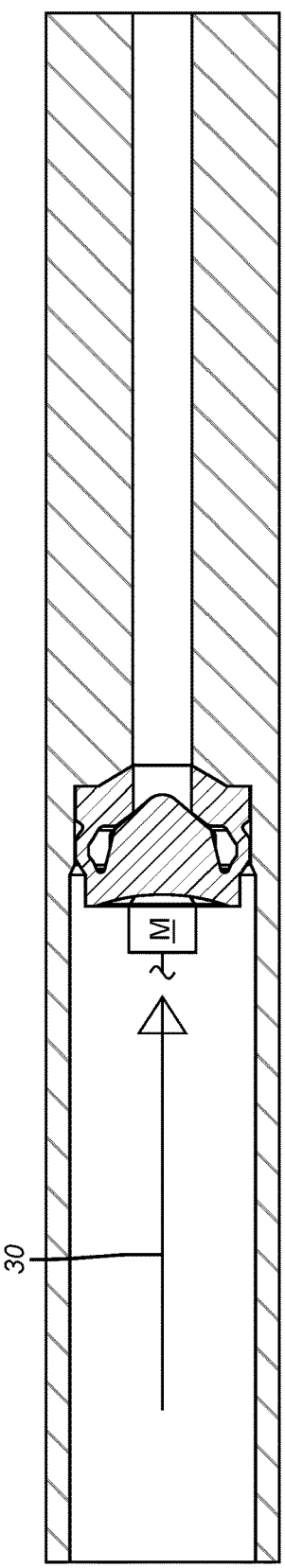

CHECK VALVE WITH VALVE MEMBER BIASED BY CONNECTORS EXTENDING FROM A VALVE SEAT FOR OPERATION OF A SUBTERRANEAN TOOL

CROSS REFERENCE TO RELATED APPLICATION

This application is a continuation-in-part of U.S. patent application Ser. No. 14/880,991, filed on Oct. 12, 2015, and claims the benefit of priority from the aforementioned application.

FIELD OF THE INVENTION

The field of the invention is check valves for subterranean use and more particularly check valves having a valve member supported by flexible members extending from a valve seat to regulate flow up to a predetermined level in a given direction before shutting off flow. The valve member can be operably connected to a subterranean tool for operation thereof.

BACKGROUND OF THE INVENTION

Check valves are used in a variety of subterranean applications. In some applications involving perforating and fracturing, a frack plug functions as a check valve in that it is normally opened for flow into the delivery string during running in. Once set the plug typically has a ball landed on a seat that prevents flow out through the plug. The perforating gun is positioned above the plug after the plug is set and fired to hopefully create perforations in the borehole. Pressure is applied from above the plug to seat the ball against a seat in the plug so that the pressure will be directed into the newly formed perforations to initiate fractures. This process is repeated in a bottom up direction until the entire wellbore is fractured. Prior to production the frack plugs are milled out and a production line and packer are run in for production from the fractured or treated zone.

Several issues have come up with check valves in frack plugs. One problem is that the ball rotates on the seat when the milling process is attempted. This relative rotation with respect to the valve seat delays the milling process because the ball winds up having to be eroded with rotation against the seat rather than just being milled through with the milling tool. Another problem with traditional ball checks occurs when the perforating gun fails to fire and must be removed and either redressed or replaced. Typically wells getting a plug and perforate treatment are highly deviated and require the use of flow from the surface to push a wireline supported gun to the desired location. This usually entails packer cups associated with the gun that stop the flow around the gun enough to fluidly power the gun to the desired location. The problem is that when the gun fails to perforate and the traditional check valve in the frack plug will not pass any fluid in a downhole direction, there is no way to use flow to deliver the replacement gun to the desired location.

A solution was earlier proposed by the inventor of the present invention in an application filed Apr. 23, 2015 in the U.S. having a Ser. No. 14/694,350 where the ball for the frack plug is only delivered if the gun fires. This design entailed an acceleration sensitive locking system to drop the ball in response to the acceleration created when the gun was fired. This design addressed the problem of the gun not firing but not the issue of the difficulty in milling out a ball that spins on its ball seat during the milling process.

Spring loaded ball check valves with non-metallic components are shown in hydraulic systems in U.S. Pat. No. 5,454,399. Check valves with a ball captured for two directional free movement are shown in U.S. Pat. No. 5,785,083. Flow responsive valves to prevent blowouts are shown in U.S. Pat. No. 4,628,996. WO98/03766 shows in FIG. 8 a ball supported in a web in the seat opening that is responsive to flow. The support impedes flow due to its placement and is subject to erosion from fluid velocities due to placement in the seat opening.

Some subterranean tools are operated with axial relative component movement. The valve of the present invention can be linked to a movable member to create the relative movement when the valve is in the closed position so that pressure delivered against the check valve in the closed position will create the relative movement in the associated subterranean tool once flow above a predetermined value is reached to close the valve. Upon reduction of pressure applied to the valve after the relative movement, the check valve automatically moves back to an open position to allow flow in the same direction of flow that previously closed the valve.

The present invention addresses the issue of spinning when milling out, having to run in a replacement gun with no perforations, expediting the milling process and providing a way to get limited flow for gun redelivery with cutting off flow with larger flow rates in a simple design where components have multiple functionality to make the overall design simple and more amenable to reliable operation with nonmetallic material for expediting millout. These and other aspects of the present invention will be more readily apparent to those skilled in the art from a review of the description of the preferred embodiment and the associated drawings while recognizing that the full scope of the invention is to be found in the appended claims.

SUMMARY OF THE INVENTION

A check valve has a valve member flexibly attached to a seat with resilient members that fold in response to flow above a predetermined value to shut the valve. The flexibly extending members store potential energy that is released to separate the valve member from the seat when the pressure applied against the seated valve member declines to the point that the potential energy stored in the flexible members is able to move the valve member off the seat. The valve assembly including the valve member, the seat and the flexible members can be a common material, or can be all one or more nonmetallic materials or involve composites or other easily drilled materials that are compatible with the operating conditions of pressure differential, temperature and composition of the well fluid. The flexible members resist valve member rotation relative to a seat during milling. The check valve can be operatively engaged to a subterranean tool such as a sliding sleeve, for example, so that in the closed position pressure applied to the check valve can be used to move the valve and sliding sleeve in tandem.

BRIEF DESCRIPTION OF THE DRAWINGS

FIG. 1 is a section view through the valve with flow passing in a downhole direction when the flexible members keep the valve member off the seat;

FIG. 2 is the view of FIG. 1 with flow increased to the point of closing the valve;

DETAILED DESCRIPTION OF THE PREFERRED EMBODIMENT

Figure 3:
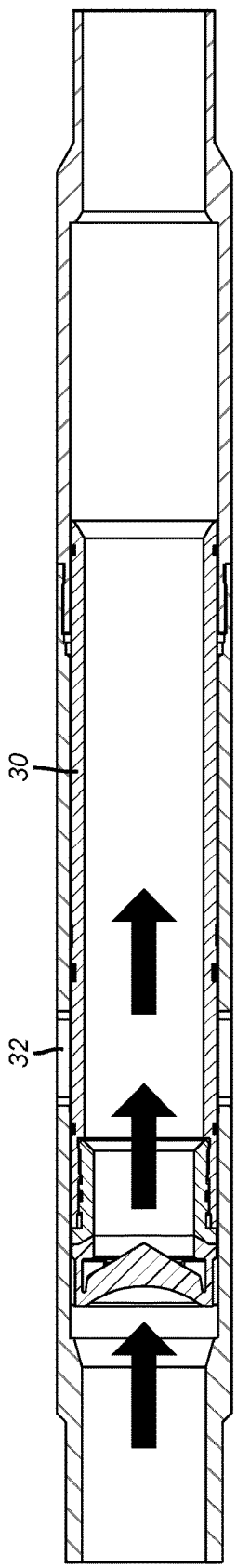
FIG. 3 is a section view through the valve of FIG. 1 before the sliding sleeve is shifted.

A frack plug body 10 has an uphole end 12 and a downhole end 14. A seat 16 surrounds outlet passage 18 and has a plurality of flexible extending members 20 to hold the valve member 22 spaced apart from opening 24 as shown in FIG. 1. The extending members 20 are also disposed peripherally of opening 24 to avoid constricting opening 24 while also keeping them away from the highest fluid velocities that are seen in opening 24. The valve member has a leading taper 26 that engages the sealing surface 28 as seen by comparing FIGS. 1 and 2. The components hold the relative positions in FIG. 1 when flow from end 12 toward end 14 is below a predetermined value. The number, dimensions and materials of construction of members 20 can be varied to obtain the desired flow rate below which valve member 22 is held away from the sealing surface 28. Typically this predetermined flow rate will approximate the pumped flow that interacts with peripheral seals on a wireline supported perforating gun that is not shown so that the replacement gun for a gun that failed to fire can be introduced and properly placed in a desired location in a reasonable time. Once the original or replacements guns fire, the flow rate from the surface in the direction of arrow can be increased moving the taper 26 against sealing surface 28 as shown in FIG. 2 for the valve closed position. Once that happens fracturing or other treatment can be forced into the perforations to create fractures or otherwise condition the formation for subsequent injection or production.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc., all collectively included in a term "treating" as used herein. Another operation can be production from said zone or injection into said zone.

The use of the extending members 20 also resists relative rotation of the valve member 22 when milling it out with a mill schematically labeled as M. Limiting or eliminating relative rotation, depending on the design parameters and number of the extending members 20 will allow fast millout of the valve member 22.

The entirety of the valve assembly shown in FIGS. 1 and 2 can be made of a single material or multiple materials which are preferably non-metallic. Alternatively the sealing surface or the extending members 20 may be composites, dual compound elastomers or even metallic. Preferably the material for the valve member 22 is an elastomer. When using a single material for the entire assembly the preferred material is an elastomer or a relatively soft material for easy drilling out that can also withstand the high pressure differential from the treatment taking place in the FIG. 2 position above the valve and into the openings providing access to the formation. The extending members 20 are preferably short enough to collapse at a single location between sealing surface 28 and the mounting location to the valve member 22 although more than one flexing or folding location is also contemplated. The valve member preferably is larger than opening 24 to avoid entering it and getting stuck. However, the alignment of surfaces between the valve member 22 at its leading end facing the seat 16 can be varied. Instead of taper 26 the leading end of the valve member 22 can be flat or curved. The seat 16 can be secured to the body 10 with adhesive or with fasteners or locking sleeves preferably made of an easily drilled material. Optionally, internal voids or scores can be used to expedite the millout process with the understanding that the resulting part strength is adequate for holding the needed pressure differential in the no flow condition during a treatment.

The assembly of the seat, the valve member and the extending members can be all one piece or in discrete pieces to be assembled, although a one piece construction is preferred. The assembly can be run in within a plug or other tools that is part of a tubing string or delivered to the plug or other tool after the string with the plug or other tools is already in position in the borehole.

Since flow is possible below a predetermined flow rate the original or replacement gun does not need to be introduced with coiled tubing to be able to push the gun to the desired location. The ability to flow against packer cup seals associated with a gun at a predetermined rate avoids the need for slow and expensive alternatives such as coiled tubing.

Figure 4:
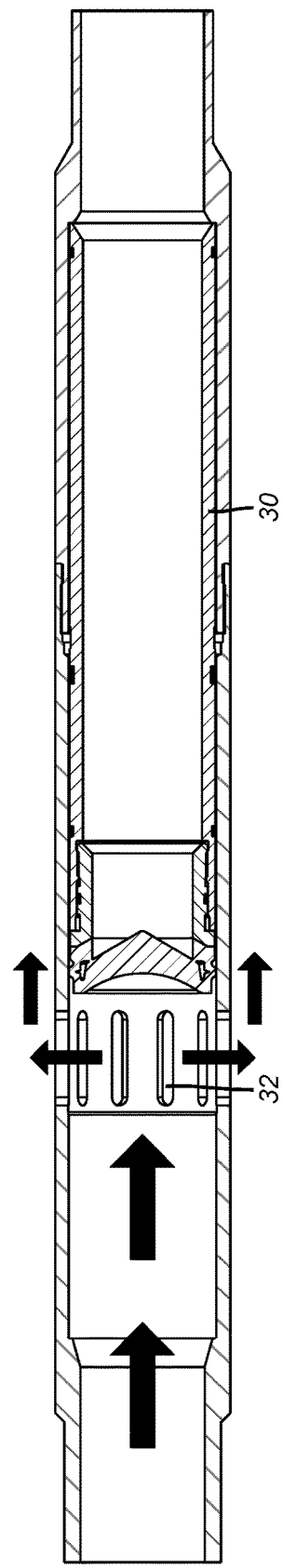
FIG. 4 is the view of FIG. 3 with the valve closed and the sliding sleeve shifted with pressure applied to the closed valve.

FIGS. 3 and 4 show the above described check valve used in conjunction with a subterranean tool such as a sliding sleeve 30. The two can be assembled in an abutting relation or the valve can be delivered to the sliding sleeve 30 at a later time with flow. Once a predetermined flow is exceeded through the valve to move the valve member 22 to the seat 16 pressure can be built up so that the body 10 moves with the sliding sleeve 30 in tandem to either open or close the ports 32 associated with the sliding sleeve 30. While a sliding sleeve is preferred other tools can be operated with movement of body 10 and the movement of the body 10 or the tool such as sleeve 30 does not necessarily need to be exclusively in an axial direction.

The above description is illustrative of the preferred embodiment and many modifications may be made by those skilled in the art without departing from the invention whose scope is to be determined from the literal and equivalent scope of the claims below:

We claim:

1. A check valve for a tubular in subterranean treatment use, comprising:
   a seat in the tubular having an opening therethrough;
   a valve member non-releasably retained in a spaced relation to said opening in said seat when there is no flow and up to a predetermined flow rate in a forward direction, from uphole to downhole, by force delivered from at least one flexible member extending from said seat and located peripherally to said opening;
   said at least one flexible member flexing radially toward the tubular to bring said valve member into sealing contact with said seat to close said opening when said predetermined flow rate is exceeded.

2. The check valve of claim 1, wherein:
   said seat, valve member and at least one flexible member are made of one piece.

3. The check valve of claim 1, wherein:
said seat, valve member and at least one flexible member are made of non-metallic material.

4. The check valve of claim 1, wherein:
said at least one flexible member comprises a plurality of spaced flexible members positioned to restrain relative rotation between said valve member and said seat.

5. The check valve of claim 1, wherein:
said at least one flexible member flexes by bending in at least one location between opposed ends thereof, said ends attached to said seat and said valve member respectively.

6. The check valve of claim 1, wherein:
said valve member having a tapered leading end that at least in part enters said opening when contacting said seat.

7. The check valve of claim 1, wherein:
said seat further comprises a sealing surface immediately surrounding said opening;
said valve member having a parallel surface to said sealing surface for circumferential contact all-around said sealing surface.

8. The check valve of claim 7, wherein:
said sealing surface further comprising a composite, single or multiple compound elastomer or a metal.

9. The check valve of claim 3, wherein:
said non-metallic comprises an elastomer.

10. The check valve of claim 1, wherein:
said valve member having a flat leading end that does not enter said opening when contacting said seat.

11. A subterranean formation treatment method, comprising:
providing a seat in a tubular having an opening therethrough;
a valve member non-releasably retained in a spaced relation to said opening in said seat when there is no flow and up to a predetermined flow rate in a forward direction, from uphole to downhole, by force delivered from at least one flexible member extending from said seat and located peripherally to said opening;
said at least one flexible member flexing radially toward the tubular to bring said valve member into sealing contact with said seat to close said opening when said predetermined flow rate is exceeded; and
pressurizing against said at least one flexible member to perform a treatment into a surrounding formation.

12. A subterranean formation treatment method comprising:
operating on a tubular string a check valve assembly that does not substantially move a valve member and restrict flow coming into the string when running in, said valve member permits flow in a forward direction, from uphole to downhole, out of the string up to a predetermined flow rate above which flow rate said valve member engages a seat to prevent flow out of said string;
attaching at least one radially flexible support member between said valve member and said seat and radially flexing said support member toward the tubular string when said valve member contacts said seat;
performing a treatment when said valve member engages said seat.

13. The method of claim 12, comprising:
non-releasably supporting said valve member from said seat with said at least one flexible support member.

14. The method of claim 13, comprising:
providing said valve member, seat and support member as a single piece.

15. The method of claim 13, comprising:
providing said valve member, seat and support member in a single non-metallic material.

16. The method of claim 15, comprising:
making said material an elastomer.

17. The method of claim 13, comprising:
providing a plurality of circumferentially spaced flexible support members as said at least one flexible support member;
retaining said valve member against relative rotation with respect to said seat;
milling out said valve member with said valve member retained against relative rotation with respect to said seat.

18. The method of claim 17, comprising:
bending said flexible support members in response to flow to store potential energy as said valve member moves toward said seat in response to flow out of said string;
releasing said potential energy to space said valve member from said seat when pressure on said valve member holding said valve member to said seat declines below a predetermined quantity;
connecting said valve member and said seat at opposed ends of said flexible support members.

19. The method of claim 12, comprising:
delivering a perforating gun using flow out of said string at or below said predetermined flow rate;
creating openings in said tubular string with said perforating gun for said performing a treatment.

20. The method of claim 12, comprising:
removing an initial perforating gun from said tubular string if said gun fails to fire;
delivering a redressed said perforating gun or a replacement perforating gun using flow out of said string at or below said predetermined flow rate;
creating openings in said tubular string for said performing a treatment with either said gun.

21. An assembly of a check valve and a subterranean tool for a tubular in subterranean treatment use, comprising:
a seat in the tubular having an opening therethrough;
a valve member non-releasably retained in a spaced relation to said opening in said seat when there is no flow and up to a predetermined flow rate in a forward direction, from uphole to downhole, by force delivered from at least one flexible member extending from said seat and located peripherally to said opening; said at least one flexible member flexing radially toward the tubular to bring said valve member into sealing contact with said seat to close said opening when said predetermined flow rate is exceeded;
said seat movably mounted for selective pressure induced tandem movement with the subterranean tool when said valve member is in contact with said seat.

22. The assembly of claim 21, wherein:
said seat, valve member and at least one flexible member are made of one piece.

23. The assembly of claim 21, wherein:
said seat, valve member and at least one flexible member are made of non-metallic material.

24. The assembly of claim 21, wherein:
said at least one flexible member comprises a plurality of spaced flexible members positioned to restrain relative rotation between said valve member and said seat.

25. The assembly of claim 21, wherein:
said at least one flexible member flexes by bending in at least one location between opposed ends thereof, said ends attached to said seat and said valve member respectively.

26. The assembly of claim 21, wherein:
said valve member having a tapered leading end that at least in part enters said opening when contacting said seat.

27. The assembly of claim 21, wherein:
said seat further comprises a sealing surface immediately surrounding said opening;
said valve member having a parallel surface to said sealing surface for circumferential contact all-around said sealing surface.

28. The assembly of claim 27, wherein:
said sealing surface further comprising a composite, single or multiple compound elastomer or a metal.

29. The assembly of claim 23, wherein:
said non-metallic comprises an elastomer.

30. The assembly of claim 21, wherein:
said tandem movement is in at least an axial direction.

31. The assembly of claim 21, wherein:
said subterranean tool further comprises a sliding sleeve.

32. The assembly of claim 21, wherein:
said seat is mounted adjacent the subterranean tool in the tubular when run to the subterranean location or thereafter delivered to the subterranean tool with the tubular at the subterranean location.

33. A subterranean formation treatment method comprising:
running in on a tubular string or subsequently delivering through the tubular string a check valve assembly that does not substantially move a valve member and restrict flow coming into the string when running in, said valve member permits flow out of the string up to a predetermined flow rate above which flow rate out of said string said valve member engages a seat as at least one flexible support member that connects said valve member to said seat flexes radially to prevent flow out of said string from below said seat;
displacing said check valve assembly with pressure applied to said valve member when engaged to said seat to operate a subterranean tool with said displacing;
performing a treatment after said subterranean tool is operated.

34. The method of claim 33, comprising:
non-releasably supporting said valve member from said seat with said at least one flexible support member.

35. The method of claim 34, comprising:
providing said valve member, seat and said flexible support member as a single piece.

36. The method of claim 34, comprising:
providing said valve member, seat and said flexible support member in a single non-metallic material.

37. The method of claim 36, comprising:
making said material an elastomer.

38. The method of claim 34, comprising:
providing a plurality of circumferentially spaced flexible support members as said at least one flexible support member;
retaining said valve member against relative rotation with respect to said seat when milling out said valve member.

39. The method of claim 38, comprising:
bending said flexible support members in response to flow to store potential energy as said valve member moves toward said seat in response to flow out of said string;
releasing said potential energy to space said valve member from said seat when pressure on said valve member holding said valve member to said seat declines below a predetermined quantity;
connecting said valve member and said seat at opposed ends of said flexible support members.

40. The method of claim 33, comprising:
delivering a perforating gun using flow out of said string at or below said predetermined flow rate;
creating openings in said tubular string for said performing a treatment with said gun.

41. The method of claim 33, comprising:
operating a sliding sleeve valve as said subterranean tool.

* * * * *